United States Patent
Allen et al.

(10) Patent No.: US 9,916,395 B2
(45) Date of Patent: Mar. 13, 2018

(54) DETERMINING ANSWER STABILITY IN A QUESTION ANSWERING SYSTEM

(71) Applicant: International Business Machines Corporation, Armonk, NY (US)

(72) Inventors: Corville O. Allen, Morrisville, NC (US); Lisa M. Bradley, Cary, NC (US); Christina R. Carlson, Chanhassen, MN (US); Andrew R. Freed, Cary, NC (US); Roderick C. Henderson, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 14/588,910

(22) Filed: Jan. 3, 2015

(65) Prior Publication Data

US 2016/0196299 A1 Jul. 7, 2016

(51) Int. Cl.
G06F 17/30 (2006.01)

(52) U.S. Cl.
CPC .............................. *G06F 17/30964* (2013.01)

(58) Field of Classification Search
None
See application file for complete search history.

(56) References Cited

U.S. PATENT DOCUMENTS

| 8,412,514 B1 | 4/2013 | Feng et al. |
| 8,601,030 B2 | 12/2013 | Bagchi et al. |
| 2005/0266387 A1* | 12/2005 | Rossides .................. G09B 7/00 434/323 |
| 2006/0178884 A1* | 8/2006 | Acero .................. G06F 17/2785 704/245 |
| 2006/0282306 A1* | 12/2006 | Thissen-Roe .. G06Q 10/063112 705/7.14 |
| 2010/0191686 A1 | 7/2010 | Wang et al. |
| 2010/0332500 A1* | 12/2010 | Pan ................... G06F 17/30864 707/759 |
| 2011/0231395 A1 | 9/2011 | Vadlamani et al. |
| 2012/0041950 A1* | 2/2012 | Koll .......................... G09B 7/02 707/728 |
| 2014/0189829 A1* | 7/2014 | McLachlan ........ G06Q 20/4014 726/6 |
| 2015/0112971 A1 | 4/2015 | Wolfram et al. |
| 2015/0128240 A1* | 5/2015 | Richards ............. H04L 63/0861 726/7 |
| 2016/0147757 A1* | 5/2016 | Adderly ................... G06N 5/02 707/748 |

FOREIGN PATENT DOCUMENTS

WO 2012122198 9/2012

* cited by examiner

*Primary Examiner* — Wilson Lee
(74) *Attorney, Agent, or Firm* — VanLeeuwen & VanLeeuwen; Diana R. Gerhardt (57) ABSTRACT

An approach is provided to determine answer stability in a question answering (QA) system. In the approach, a question submitted to a question answering (QA) system is selected and data pertaining to a candidate answers generated by the QA system are analyzed. The analysis of the data results in a stability characteristic that pertains to the candidate answers. A confidence value associated with the candidate answers is adjusted based on the respective answer's stability characteristic. One or more of the candidate answers are provided to a requestor based on the adjusted confidence values.

9 Claims, 7 Drawing Sheets

DETERMINING ANSWER STABILITY IN A QUESTION ANSWERING SYSTEM

BACKGROUND

With the increased usage of computing networks, such as the Internet, people are inundated with the amount of structured and unstructured information available from various sources. Information gaps abound as users search for information on various subjects and try to piece together what they find and what they believe to be relevant. To assist with such searches, knowledge management systems have been developed which take an input, analyze it, and return results indicative of the most probable results to the input. These question answering (QA) systems provide automated mechanisms for searching through a knowledge base with numerous sources of content, e.g., electronic documents, and analyze them to determine a result and a confidence measure as to how accurate the result is in relation to the input.

QA systems are built on technology used for hypothesis generation, massive evidence gathering, analysis, and scoring. The QA system takes an input question, analyzes it, decomposes the question into constituent parts, generates one or more hypothesis based on both the decomposed question and the results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

One challenge of QA systems is answer stability. While a QA system provides answers to questions, it does not indicate the stability of the answer nor when that answer might change. Presently, answer stability can be found by repeatedly asking the QA system the same question and monitor for changes in the answers over time. This is time and resource intensive.

BRIEF SUMMARY

According to one embodiment of the present disclosure, an approach is provided to determine answer stability in a question answering (QA) system. In the approach, a question submitted to a question answering (QA) system is selected and data pertaining to a candidate answers generated by the QA system are analyzed. The analysis of the data results in a stability characteristic that pertains to the candidate answers. A confidence value associated with the candidate answers is adjusted based on the respective answer's stability characteristic. One or more of the candidate answers are provided to a requestor based on the adjusted confidence values.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
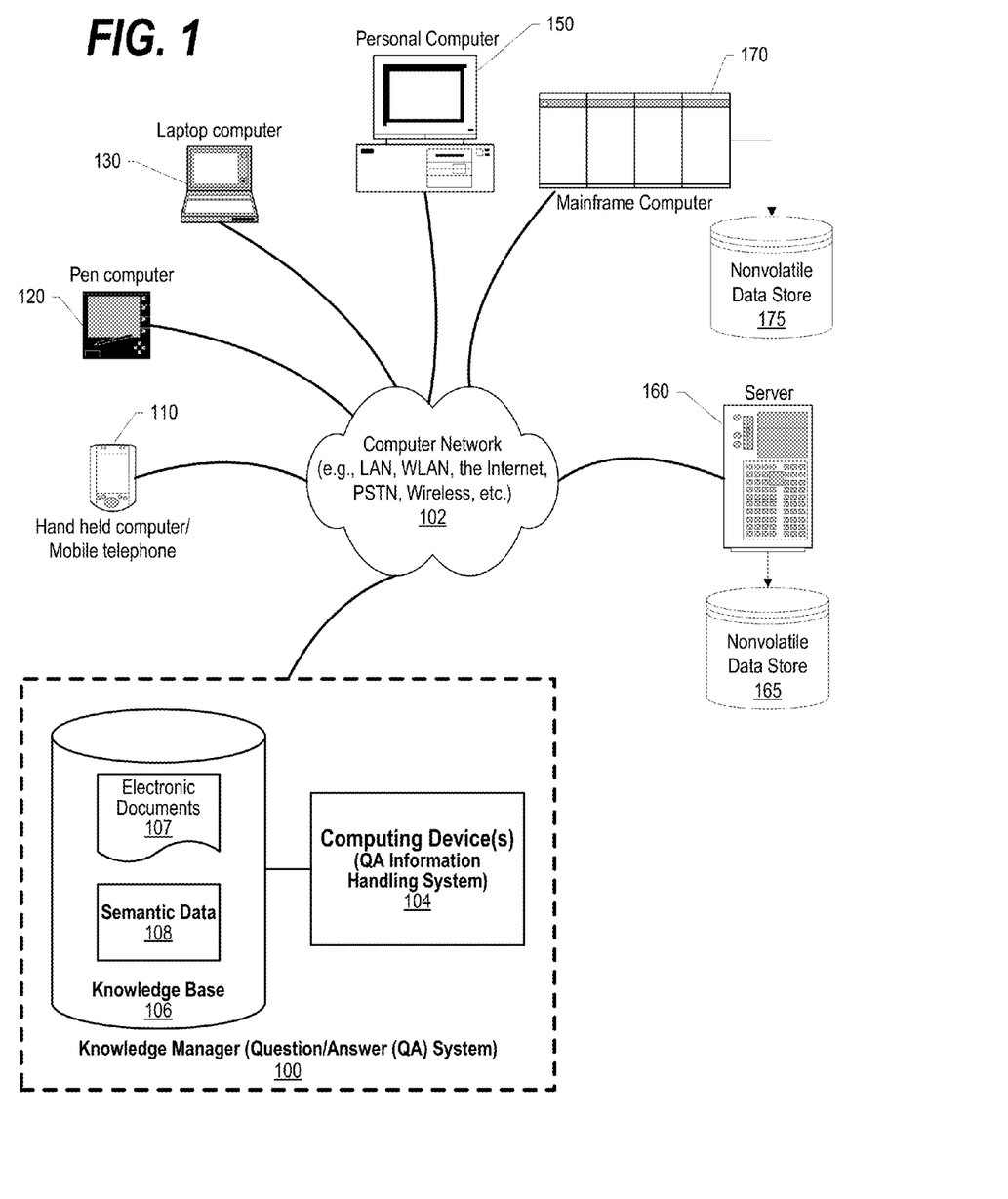
FIG. 1 depicts a schematic diagram of one illustrative embodiment of a question/answer creation (QA) system in a computer network.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, New York, which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
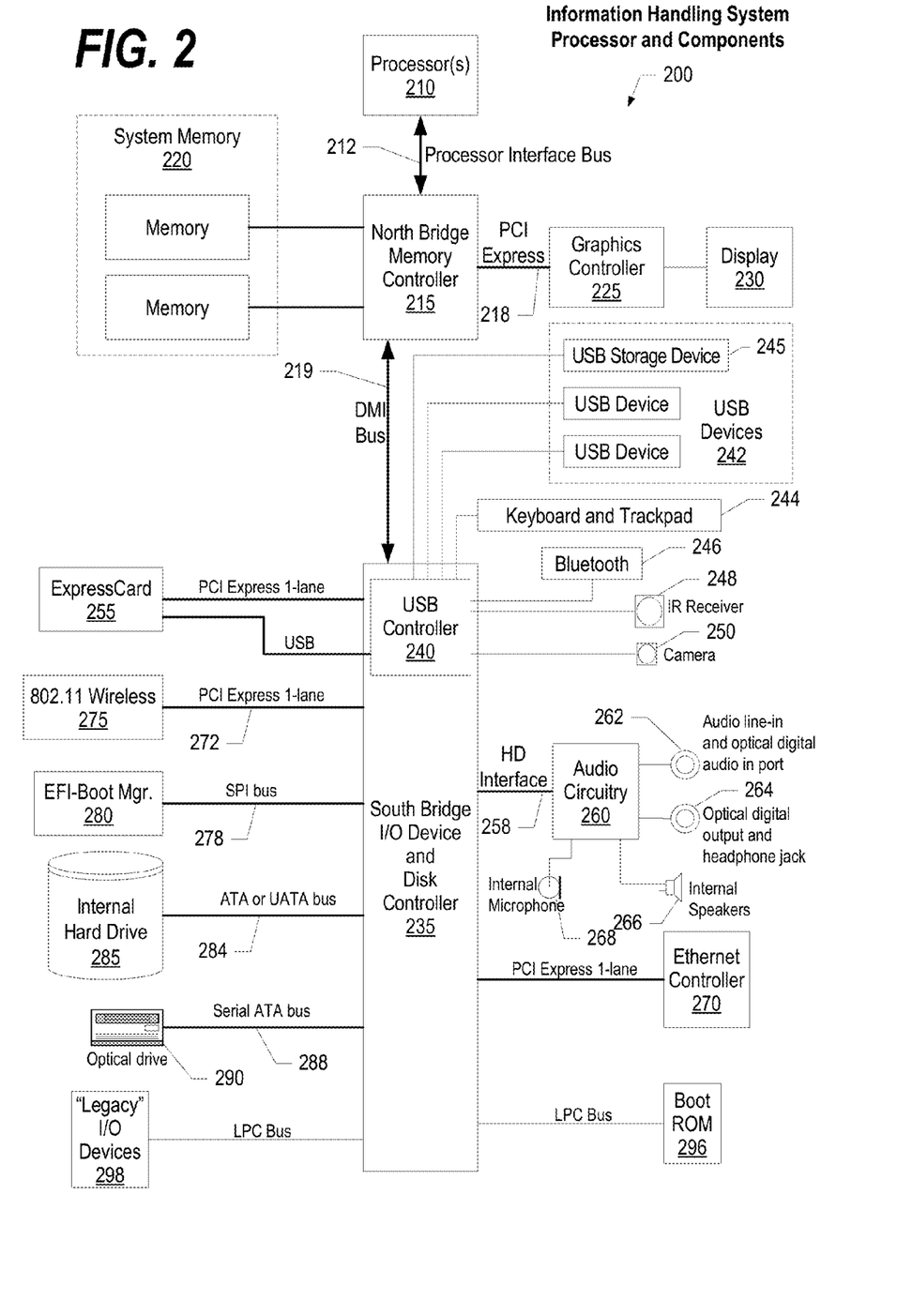
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212.

Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-7 depict an approach that determines answer stability in a question answering (QA) system. The approach determines how often an answer is changed and the degree of stability of that answer. Various aspects are performed to accomplish this approach. These aspects include (i) determining the key characteristics of the answer and then determine what key characteristic affected the change of that answer by evidence analysis; (ii) developing an inferencing chain for the reason or conceptual reason for the change in an answer, with the chain being: characteristic→reason-→change-timeframe; (iii) scoring the inferencing chain reasons based on the key characteristic, the prevalence of the reason, and the probability and occurrence of changes to the reason for the domain or finite concept domain; (iv) scoring the associated time periods and answers with the rate and type of change against the classification and/or features; (v) using the combination of the scores to predict the likelihood for change and how often a change is predicted.

Figure 3:
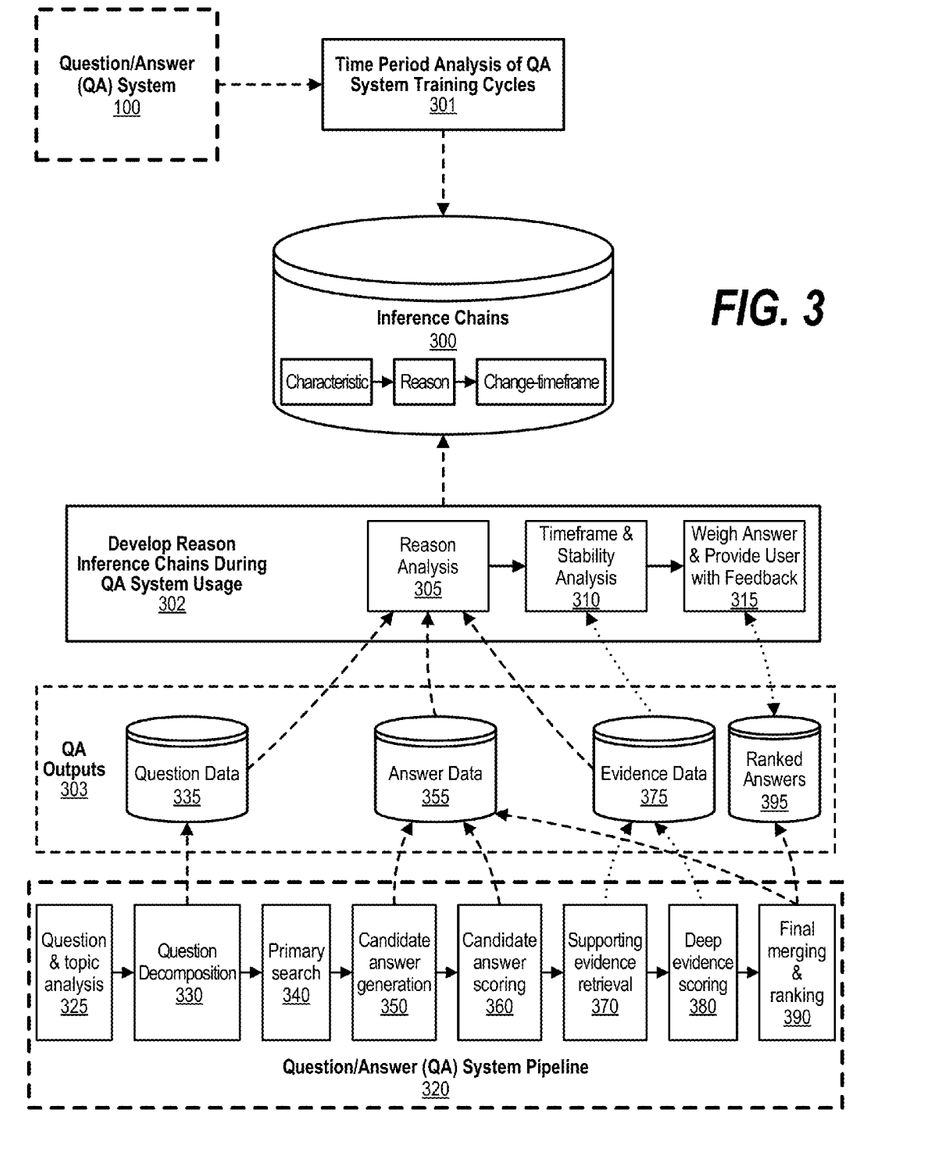
FIG. 3 is an exemplary diagram depicting components used in determining answer stability in a QA system.

FIG. 3 is an exemplary diagram depicting components used in determining answer stability in a question answering (QA) system. Two types of analysis are shown that provide inference chains that predict the likelihood that an answer will change and how often a change is predicted. The inference chains are stored in data store 300. One type of analysis is a time period analysis of QA system training cycles (process 301) that analyzes changes to answers when the QA system is trained. A depiction of a time period analysis is set forth in the flowchart shown in FIG. 7.

Another type of analysis is the development of inference chains during QA system usage (process 302). A depiction of a QA system usage analysis is set forth in the flowcharts shown in FIGS. 4-6. As shown, process 302 is broken down into a number of sub-processes used to develop the inference chains. The various inputs used by process 302 are outputs of QA system pipeline 320 with is the pipeline of processes used by the QA system to analyze and answer the question posed by a requestor, such as a user.

QA system pipeline 320 shows a pipeline utilized by the QA system with a user or other requestor providing questions to the QA system. QA system pipeline 320 includes a number of steps used to process a user's question and return a most likely answer. Step 325 is question and topic analysis which may include identifying whether the user's question is requesting an answer that might be included in crowd sourced information 310, such as a question requesting opinions or ideas. Step 330 is question decomposition which identifies question keywords (and synonyms) found in the user's question. Data derived by the QA system during question decomposition is stored as question data and stored in data store 335.

Step 340 is a primary search where the QA system searches for possible answers to the user's question with crowd sourced information being included in the primary search. Step 350 is candidate answer generation that generates candidate answers based upon the primary search. Step 360 is candidate answer scoring. Data derived by the QA system during candidate answer generation and scoring is stored as answer data and stored in data store 355.

Step 370 is supporting evidence retrieval for each of the candidate answers. Step 380 is deep evidence scoring. During deep evidence scoring, document ingested by the QA system are used to provide weights to the retrieved supporting evidence. Data derived by the QA system during supporting evidence retrieval and deep evidence scoring is stored as evidence data and stored in data store 375.

Finally, at step 390 final merging and ranking of the supporting evidence and candidate answers takes place. The final ranking results in one of the candidate answers being the "best" ranked candidate answer. This best ranked candidate answer is returned to the user as the most likely answer to the user's question. Data derived by the QA system during final merging and ranking is stored as ranked answer data and stored in data store 395.

Process 302 that develops inference chains during QA system usage utilizes the data derived by the QA system while processing the user's question. This data includes question data stored in data store 335, answer data stored in data store 355, evidence data stored in data store 375, and ranked answer data stored in data store 395.

Reason analysis (sub-process 305) receives inputs from question data 335, answer data 355, and evidence data 375 to analyze reasons an answer changed. Timeframe and stability analysis (sub-process 310) receives evidence data from data store 375 and analyzes the answer's stability over time utilizing the reason analysis performed by sub-process 305. Finally, sub-process 315 weighs the answer data and provides the user with feedback regarding the stability of the answer and the predicted likelihood that the answer will change and the timeframe of the change using the reason analysis, timeframe and stability analysis, and the ranked candidate answer data from data store 395. The resulting inference chain (characteristic→reason→change-timeframe) is stored in data store 300.

Figure 4:
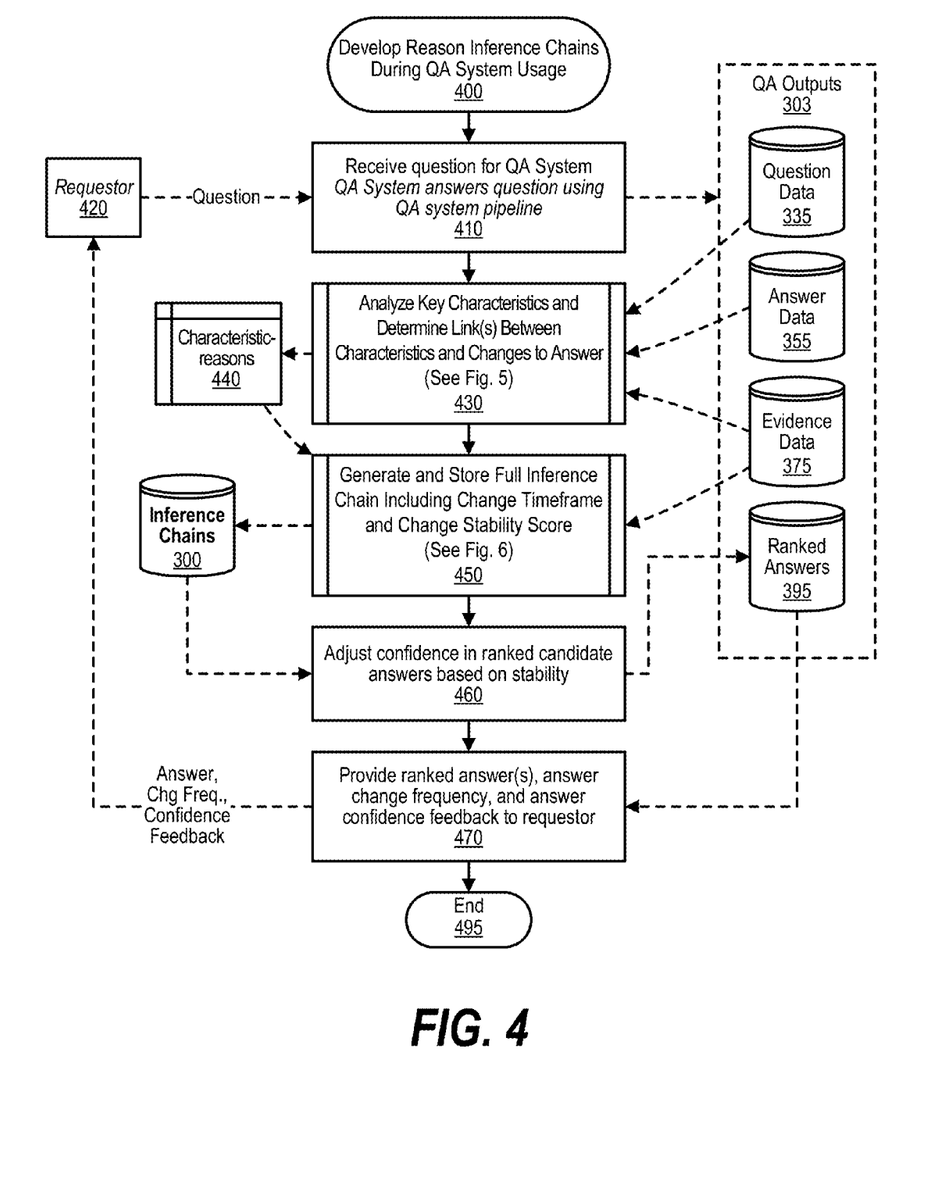
FIG. 4 is an exemplary flowchart depicting steps taken to develop reason inference chains during QA system usage.

FIG. 4 is an exemplary flowchart depicting steps taken to develop reason inference chains during question answering (QA) system usage. FIG. 4 processing commences at 400 and shows the steps taken by a process that performs a routine that develops reason inference chains during QA system usage. At step 410, the process receives a question for the QA System from requestor 420, such as a user of the QA system. The QA System answers question using QA system pipeline resulting in QA output data stores 303 previously described with reference to FIG. 3.

Figure 5:
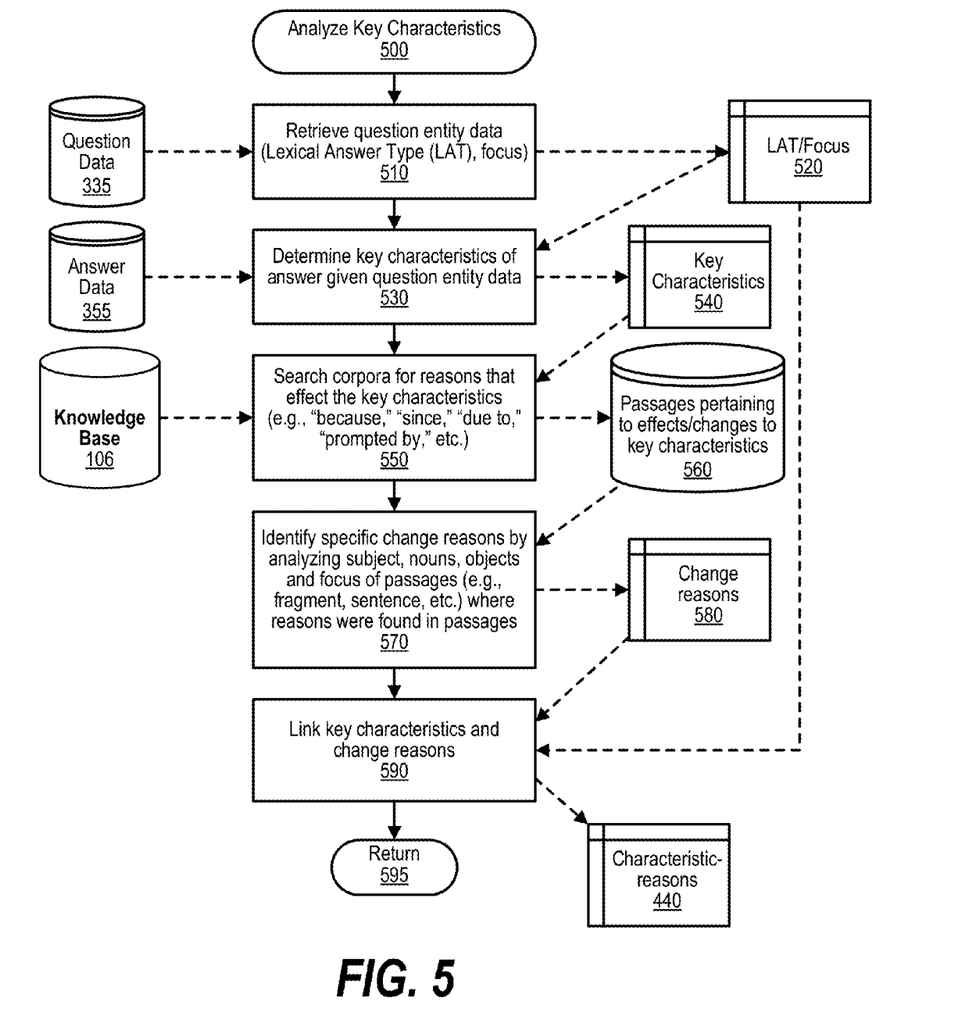
FIG. 5 is an exemplary flowchart depicting steps taken to analyze characteristics and determine links for changes to an answer in a QA system.

At predefined process 430, the process performs the Analyze Key Characteristics and Determine Link(s) Between Characteristics and Changes to Answer routine (see FIG. 5 and corresponding text for processing details). Predefined process 430 receives inputs from question data (data store 335), answer data (data store 355), and evidence data (data store 375). The result of predefined process 430 are characteristic-reasons for changes to the answer which are stored in memory area 440.

Figure 6:
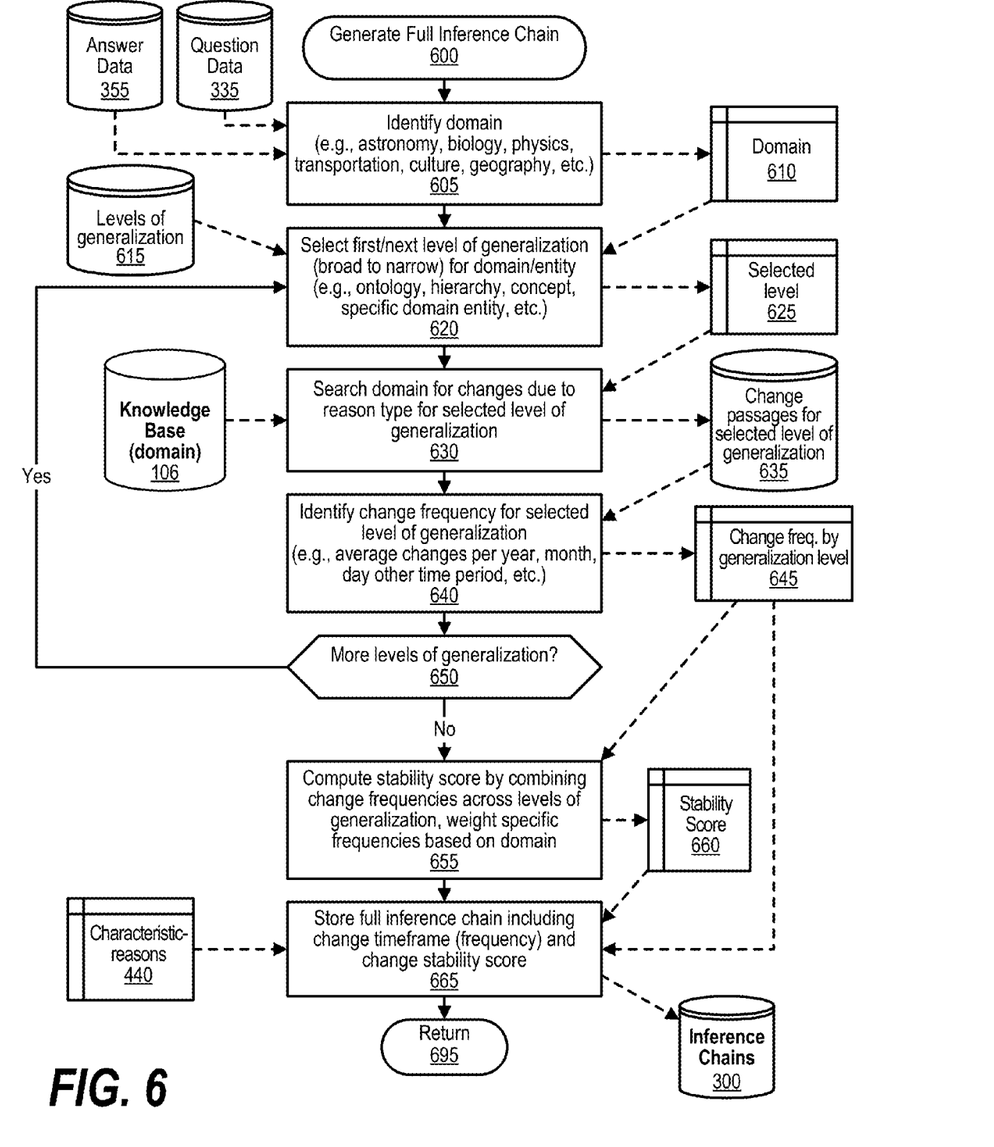
FIG. 6 is an exemplary flowchart depicting steps taken to generate a full inference chain including a change timeframe and change stability score for changes to an answer in a QA system.

At predefined process 450, the process performs the Generate and Store Full Inference Chain Including Change Timeframe and Change Stability Score routine (see FIG. 6 and corresponding text for processing details). Predefined process 450 receives evidence data (data store 375) as an input along with the characteristic-reasons discovered by predefined process 430 and stored in memory area 440. The result of predefined process 450 is a full inference chain that is stored in data store 300.

At step 460, the process adjusts the confidence in ranked candidate answers based on the stability found for the various candidate answers. The stability of the candidate answers is retrieved from inference chains stored in data store 300 and the adjustment to the ranking of candidate answers is made to the scores stored in data store 395 that stores the ranked answers and their respective scores. At step 470, the process provides the ranked answers, the answer change frequency prediction, and the answer confidence feedback to requestor 420. FIG. 4 processing thereafter ends at 495.

FIG. 5 is an exemplary flowchart depicting steps taken to analyze characteristics and determine links for changes to an answer in a question answering (QA) system. FIG. 5 processing commences at 500 and shows the steps taken by a process that performs a routine that analyzes key characteristics pertaining to changes to the answer of a question. At step 510, the process retrieves question entity data (Lexical Answer Type (LAT), focus) from data store 335. Step 510 stores the LAT/focus data in memory area 520.

At step 530, the process determines key characteristics of the answer given the question entity data. The question entity data (LAT/focus) are retrieved from memory area 520 and the answer data is retrieved from data store 355. The key characteristics identified at step 530 are stored in memory area 540. At step 550, the process searches corpora 106 for reasons that effect the key characteristics that are retrieved from memory area 540. Reasons may be identified based on certain key phrases, such as "because," "since," "due to," "prompted by," etc., with the key phrases being proximate to the reasons for the change. Step 550 stores the reasons found in data store 560, with the reasons being passages pertaining to the effects and/or changes that were found to effect the key characteristics.

At step 570, the process identifies specific change reasons by analyzing the subject, nouns, objects and focus of the passages where reasons were found that were stored in data store 560. The specific change reasons might be sentence fragments, phrases, sentence, etc. found in the passages stored in data store 560. The change reasons found by step 570 are stored in memory area 580. At step 590, the process links the key characteristics found and stored in memory area 540 with the change reasons found and stored in memory area 580. Step 590 stores the linked characteristics and reasons in memory area 440. FIG. 5 processing thereafter returns to the calling routine (see FIG. 4) at 595.

FIG. 6 is an exemplary flowchart depicting steps taken to generate a full inference chain including a change timeframe and change stability score for changes to an answer in a question answering (QA) system. FIG. 6 processing commences at 600 and shows the steps taken by a process that performs a routine that generates a full inference chain regarding answer changes to questions. At step 605, the process identifies the domain of the question/answer. For example, the domain might relate to one the fields of astronomy, biology, physics, transportation, culture, geography, etc. The domain that is identified is stored in memory area 610.

At step 620, the process selects the first level of generalization (broad to narrow) for the identified domain and entity (e.g., ontology, hierarchy, concept, specific domain entity, etc.). The levels of generalization for the identified domain/entity are retrieved from data store 615, and the level that is currently selected is stored in memory area 625.

At step 630, the process searches the identified domain for changes due to a reason type for the selected level of generalization. The domain that is searched is stored within corpus, or knowledge base, 106 that is utilized by the QA system. Change passages found as a result of the search performed at step 630 are stored in data store 635 for the selected level of generalization.

At step 640, the process identifies the change frequency found for the selected level of generalization by analyzing the change passages stored in data store 635. The change frequency for the selected level of generalization might be the average changes per year, month, day, or other time period. The change frequency found for the selected level of generalization is stored in memory area 645.

The process determines as to whether there are more levels of generalization to process for the identified domain (decision 650). If there are more levels of generalization to process for the identified domain, then decision 650 branches to the 'yes' branch which loops back to select and process the next level of generalization as described above. This looping continues until there are no more levels of generalization to process, at which point decision 650 branches to the 'no' branch and processing continues.

At step 655, the process computes a stability score by combining the change frequencies identified across the various levels of generalization for the domain. The change frequencies are retrieved from memory area 645. During scoring, the process weighs specific frequencies based on identified domain. The stability score generated by step 655 is stored in memory area 660. At step 665, the process stores the full inference chain including change timeframe (frequency) retrieved from memory area 440 and the change stability score retrieved from memory area 660. The full inference chain is stored in data store 300. FIG. 6 processing thereafter returns to the calling routine (see FIG. 4) at 695.

Figure 7:
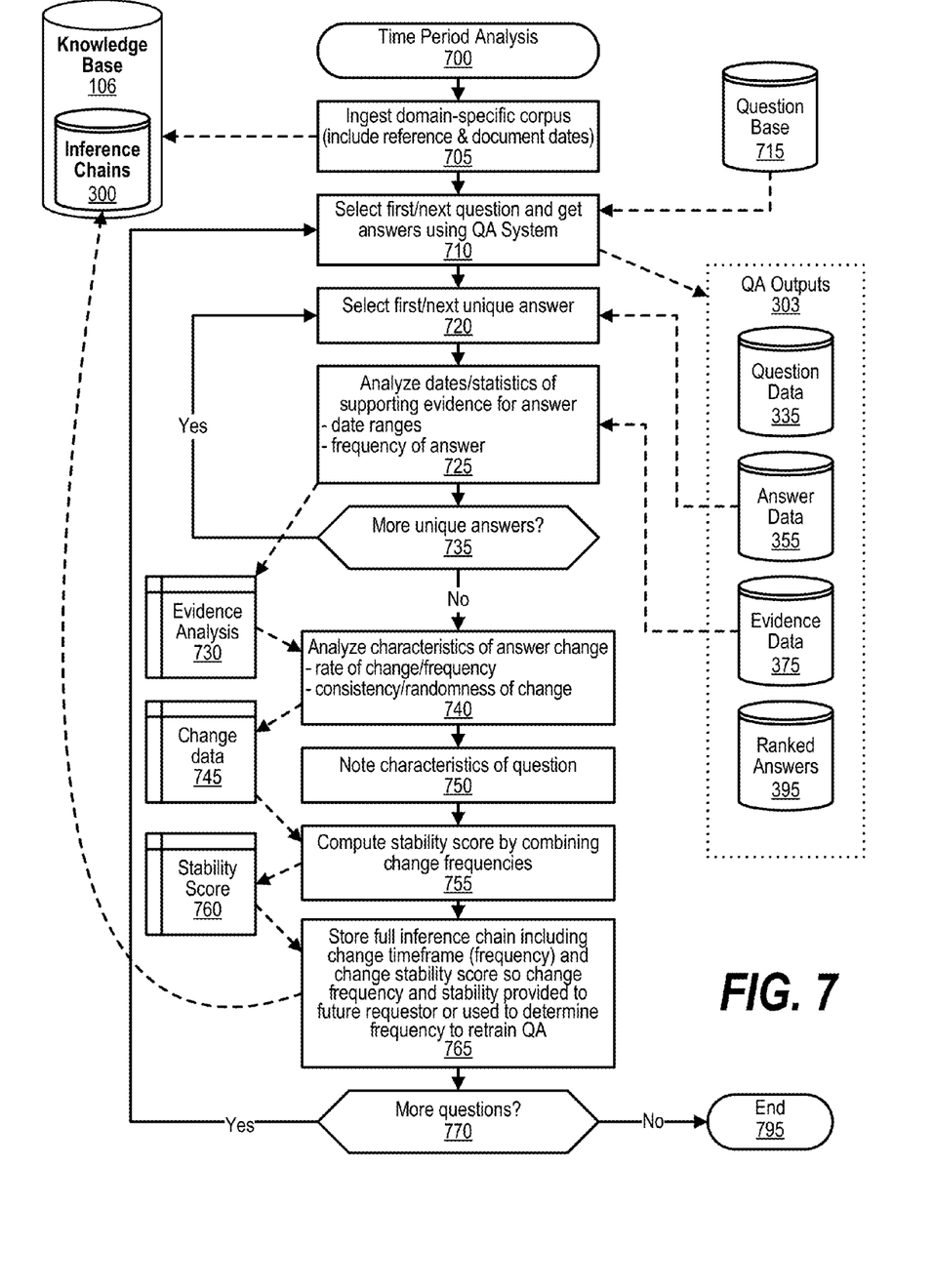
FIG. 7 is an exemplary flowchart depicting steps taken to perform a time period analysis of questions posed to a QA system.

FIG. 7 is an exemplary flowchart depicting steps taken to perform a time period analysis of questions posed to a question answering (QA) system. FIG. 7 processing commences at 700 and shows the steps taken by a process that performs a routine that performs a time period analysis. At step 705, the process ingests the domain-specific corpus. The domain specific corpus includes reference and document dates pertaining to the data ingested into the domain-specific corpus. The ingested corpus is stored in data store 106.

At step 710, the process selects the first question from question base data store 715 and retrieves answers from the QA System by processing the question with the QA system pipeline 320 which was shown in FIG. 3. The QA system generates QA outputs 303 when processing the question. The QA outputs, as previously described, includes question data that is stored in data store 335, answer data that is stored in data store 355, evidence data that is stored in data store 375, and ranked answer data that is stored in data store 395.

At step 720, the process selects the first unique answer that was generated when the question was processed by the QA system. The unique answers are selected from data store 355. At step 725, the process analyzes the dates and statistics of the supporting evidence for the selected answer, such as date ranges and the frequency of answer. The supporting evidence is retrieved from data store 375. The analysis performed at step 725 is stored as evidence analysis in memory area 730.

The process determines as to whether more unique answers were generated when the question was processed by the QA system (decision 735). If more unique answers were generated when the question was processed by the QA system, then decision 735 branches to the 'yes' branch which loops back to select and process the next unique answer as described above. This looping continues until there are no more unique answers to process, at which point decision 735 branches to the 'no' branch and processing continues.

At step 740, the process analyzes the characteristics of the answer change data that was found during analysis and stored in memory area 730. The characteristics of the answer change data include the rate of change (frequency) of the answer change data and the consistency or randomness of change. The change data resulting from the analysis performed at step 740 is stored in memory area 745. At step 750, the process notes the characteristics of the question that was selected at step 710. At step 755, the process computes a stability score by combining the change frequencies found during the analysis at step 740 and stored in memory area 745. The stability score is stored in memory area 760.

At step 765, the process stores a full inference chain for the question. The full inference chain includes the change timeframe (frequency) and change stability score and is stored in data store 300 within knowledge base 106 that is utilized by the QA system. In this manner, the change frequency and stability can be provided to future requestors, such as users of the QA system, when returning answer data. In addition, the change frequency and stability can be used when assessing the frequency to retrain the QA system for a particular domain.

The process determines as to whether there are more questions in question base 715 to process to build more inference chains (decision 770). If there are more questions in question base 715 to process to build more inference chains, then decision 770 branches to the 'yes' branch which loops back to select and process the next question from question base 715 as described above. This looping continues until there are no more questions to process, at which decision 770 branches to the 'no' branch and processing ends at 795.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   selecting a question submitted to a question answering (QA) system;
   analyzing data pertaining to a plurality of answers generated by the QA system, wherein the analysis results in a stability characteristic pertaining to each of the plurality of answers, and wherein the analyzing comprises:
      determining one or more key characteristics pertaining to each answer;
      identifying a set of answers that has changed over time, wherein the set of answers includes one or more answers from the plurality of answers;
      identifying one or more reasons that the set of answers changed;
      building an inference chain for each answer included in the set of answers, wherein each inference chain links a characteristic selected from the one or more characteristics, a reason selected from the one or more reasons, and a time period over which the respective answer changed; and
      storing the inference chains in a corpora of the QA system;
   adjusting a confidence value associated with each of the answers based on the respective answer's stability characteristic; and
   providing one or more of the answers to a requestor based on the adjusted confidence values.

2. The method of claim 1 further comprising:
   identifying a domain pertaining to the question and at least one of the answers;
   identifying a change frequency over a plurality of levels of generalization corresponding to the question and the at least one of the answers; and
   computing a stability score related to the stability characteristic pertaining to the at least one of the answers, wherein the stability score combines the change frequencies across the plurality of levels of generalization.

3. The method of claim 2 further comprising:
   weighting the stability score based on the identified domain.

4. An information handling system comprising:
   one or more processors;
   one or more data stores accessible by at least one of the processors;
   a memory coupled to at least one of the processors; and
   a set of computer program instructions stored in the memory and executed by at least one of the processors in order to perform actions of:
   selecting a question submitted to a question answering (QA) system;
   analyzing data pertaining to a plurality of answers generated by the QA system, wherein the analysis results in a stability characteristic pertaining to each of the plurality of answers, and wherein the analyzing further comprises actions of:
      determining one or more key characteristics pertaining to each answer;
      identifying a set of answers that has changed over time, wherein the set of answers includes one or more answers from the plurality of answers;
      identifying one or more reasons that the set of answers changed;
      building an inference chain for each answer included in the set of answers, wherein each inference chain links a characteristic selected from the one or more characteristics, a reason selected from the one or more reasons, and a time period over which the respective answer changed; and
      storing the inference chains in a corpora of the QA system;
   adjusting a confidence value associated with each of the answers based on the respective answer's stability characteristic; and
   providing one or more of the answers to a requestor based on the adjusted confidence values.

5. The information handling system of claim 4 wherein the actions further comprise:
   identifying a domain pertaining to the question and at least one of the answers;
   identifying a change frequency over a plurality of levels of generalization corresponding to the question and the at least one of the answers; and
   computing a stability score related to the stability characteristic pertaining to the at least one of the answers, wherein the stability score combines the change frequencies across the plurality of levels of generalization.

6. The information handling system of claim 5 wherein the actions further comprise:
   weighting the stability score based on the identified domain.

7. A computer program product stored in a computer readable storage medium, comprising computer program code that, when executed by an information handling system, causes the information handling system to perform actions comprising:
   selecting a question submitted to a question answering (QA) system;
   analyzing data pertaining to a plurality of answers generated by the QA system, wherein the analysis results in a stability characteristic pertaining to each of the plurality of answers, and wherein the analyzing further comprises actions of:
      determining one or more key characteristics pertaining to each answer;
      identifying a set of answers that has changed over time, wherein the set of answers includes one or more answers from the plurality of answers;
      identifying one or more reasons that the set of answers changed;
      building an inference chain for each answer included in the set of answers, wherein each inference chain links a characteristic selected from the one or more characteristics, a reason selected from the one or more reasons, and a time period over which the respective answer changed; and
      storing the inference chains in a corpora of the QA system;
   adjusting a confidence value associated with each of the answers based on the respective answer's stability characteristic; and
   providing one or more of the answers to a requestor based on the adjusted confidence values.

8. The computer program product of claim 7 wherein the actions further comprise:
   identifying a domain pertaining to the question and at least one of the answers;
   identifying a change frequency over a plurality of levels of generalization corresponding to the question and the at least one of the answers; and computing a stability score related to the stability characteristic pertaining to the at least one of the answers, wherein the stability score combines the change frequencies across the plurality of levels of generalization.

9. The computer program product of claim 8 wherein the actions further comprise:

weighting the stability score based on the identified domain.

\* \* \* \* \*